(12) United States Patent
Yun

(10) Patent No.: US 10,207,233 B2
(45) Date of Patent: *Feb. 19, 2019

(54) APPARATUS FOR PRODUCING RAPID-HARDENING CONCRETE BY INTERMIXING AND DISSIPATING AIR IN NORMAL CONCRETE AND ADDING EARLY-STRENGTH ADMIXTURE THERETO, AND METHOD FOR PRODUCING SAME

(71) Applicant: KANGWON NATIONAL UNIVERSITY UNIVERSITY-INDUSTRY COOPERATION FOUNDATION, Gangwon-do (KR)

(72) Inventor: Kyong Ku Yun, Seoul (KR)

(73) Assignee: Kangwon National University University-Industry Cooperation Foundation, Chuncheon-si, Gangwon-do (KR)

( * ) Notice: Subject to any disclaimer, the term of this patent is extended or adjusted under 35 U.S.C. 154(b) by 247 days.

This patent is subject to a terminal disclaimer.

(21) Appl. No.: 15/103,269

(22) PCT Filed: Dec. 8, 2014

(86) PCT No.: PCT/KR2014/011981
§ 371 (c)(1),
(2) Date: Jun. 9, 2016

(87) PCT Pub. No.: WO2015/088203
PCT Pub. Date: Jun. 18, 2015

(65) Prior Publication Data
US 2016/0332915 A1 Nov. 17, 2016

(30) Foreign Application Priority Data

Dec. 10, 2013 (KR) .................. 10-2013-0153232
Dec. 8, 2014 (KR) .................. 10-2014-0174606

(51) Int. Cl.
C04B 7/00 (2006.01)
C04B 28/04 (2006.01)
(Continued)

(52) U.S. Cl.
CPC .......... B01F 5/048 (2013.01); B01F 15/0251 (2013.01); B28C 5/003 (2013.01);
(Continued)

(58) Field of Classification Search
USPC ........................................ 106/638, 654, 713
See application file for complete search history.

(56) References Cited

U.S. PATENT DOCUMENTS 3,938,786 A * 2/1976 Bernold ................ B28C 5/026
366/13
5,250,578 A * 10/1993 Cornwell ................ C04B 28/02
106/122

FOREIGN PATENT DOCUMENTS

CN 101186479 A 5/2008
JP 2007-145652 6/2007
(Continued)

OTHER PUBLICATIONS

International Search Report dated Mar. 31, 2016 for PCT/KR2014/011981.
International Search Report dated Mar. 31, 2015 for PCT/KR2014/011981.

Primary Examiner — James E McDonough
(74) Attorney, Agent, or Firm — Rabin & Berdo, P.C.

(57) ABSTRACT

The present invention relates to an apparatus for producing rapid-hardening concrete and a method for producing same, the rapid-hardening concrete being produced by intermixing and dissipating air in normal concrete and adding an early-strength admixture thereto. With respect to forming rapid-hardening concrete, mixed concrete is formed by mixing in a large volume of air bubbles to be discarded, along with an
(Continued)

early-strength admixture, to already mixed normal concrete, the early-strength admixture getting evenly dispersed therewithin by means of the ball bearing effect of the air bubbles, and when the mixed concrete is discharged, a rapid-hardening concrete is shotcreted while excess air contained in the mixed concrete is dissipated by means of high-performance air, the slump which was raised due to the large amount of air bubbles having been reduced to the slump range for normal concrete.

22 Claims, 7 Drawing Sheets

(51) Int. Cl.
*B01F 5/04* (2006.01)
*B28C 5/00* (2006.01)
*B28C 5/02* (2006.01)
*B28C 5/38* (2006.01)
*B01F 15/02* (2006.01)
*C04B 40/00* (2006.01)
*C04B 7/34* (2006.01)
*C04B 28/00* (2006.01)
*C04B 32/00* (2006.01)
*C04B 24/14* (2006.01)
*C04B 9/12* (2006.01)
*C04B 111/00* (2006.01)

(52) U.S. Cl.
CPC .............. *B28C 5/026* (2013.01); *B28C 5/381* (2013.01); *C04B 28/04* (2013.01); *C04B 40/0039* (2013.01); *C04B 2111/00155* (2013.01)

(56) References Cited

FOREIGN PATENT DOCUMENTS

| | | | | |
|---|---|---|---|---|
| JP | 2007-297250 | | 11/2007 | |
| JP | 2007297250 A | * | 11/2007 | .............. C04B 28/04 |
| KR | 20000005032 A | * | 1/2000 | ......... B60R 16/0222 |
| KR | 10-2000-0055032 | | 9/2000 | |
| KR | 10-2005-0087029 | | 8/2005 | |
| KR | 20050087029 A | * | 8/2005 | |
| KR | 10-0537953 | | 12/2005 | |
| KR | 10-0958535 | | 5/2010 | |
| KR | 10-1133569 | | 4/2012 | |

* cited by examiner

APPARATUS FOR PRODUCING RAPID-HARDENING CONCRETE BY INTERMIXING AND DISSIPATING AIR IN NORMAL CONCRETE AND ADDING EARLY-STRENGTH ADMIXTURE THERETO, AND METHOD FOR PRODUCING SAME

This application claims the priority of Korean Patent Application Nos. 10-2013-0153232 and 10-2014-0174606, filed on Dec. 10, 2013 and Dec. 8, 2014 in the KIPO (Korean Intellectual Property Office), the disclosure of which is incorporated herein entirely by reference. Further, this application is the National Stage application of International Application No. PCT/KR2014/011981, filed Dec. 8, 2014, which designates the United States and was published in Korean. Each of these applications is hereby incorporated by reference in their entirety into the present application.

TECHNICAL FIELD

The present disclosure relates to an apparatus for producing a rapid-hardening concrete and a method for producing the same, and more particularly, to an apparatus for producing a rapid-hardening concrete by intermixing and dissipating air in a normal concrete and adding an early-strength admixture thereto, which intermixes a large amount of air bubbles, which should be removed, into a mixed normal concrete together with an early-strength admixture to form a mixed concrete where the early-strength admixture is regularly dispersed in the normal concrete by means of an ball bearing effect of the air bubbles, and when the mixed concrete is discharged, dissipates excess air included in the mixed concrete by means of a high-pressure air and shoots a rapid-hardening concrete whose slump increased due to the large amount of air bubbles is reduced to a slump range of the normal concrete, and a method for producing the same.

BACKGROUND ART

A method for manifesting early strength is generally classified into two types: one using a normal Portland cement as it is and the other using a normal Portland cement mixed with an early-strength admixture.

In order to manifest a high strength at an early age of an existing normal Portland cement, a high-early-strength cement or an early-strength admixture prepared to have great powder or a great amount of components ensuring early strength is intermixed to give a much higher early strength in comparison to a high-early-strength cement concrete. However, at this time, economic feasibility and durability should be considered.

In other words, when an early-strength admixture is intermixed, costs should be considered since the early-strength admixture is much more expensive than the high-early-strength cement concrete. Also, since the early-strength admixture weakens resistance against freezing-thawing or cracks, long-term public service is deteriorated.

The high-early-strength concrete gives a compressive strength of 21 MPa, which is a usable strength, within 3 days, and early strength is manifested using a high-early-strength cement, an early-strength admixture or an early-strength chemical admixture. An ultrahigh-early-strength concrete manifests a usable strength in 1 day and generally gives an early strength by using an early-strength admixture.

An ultra-rapid-set cement manifests a usable strength 3 hours after being mixed with water and thus is used for various emergent constructions. The ultra-rapid-set cement is classified into an alumina-based ultra-rapid-set cement, an amorphous alumina-based ultra-rapid-set cement and a Hauyne ultra-rapid-set cement depending on minerals giving a rapid-hardening property. The ultra-rapid-set cement is obtained by mixing ultra-rapid-set clinker powder to a normal Portland cement by the content of 20 to 45% depending on its rapid-hardening characteristic.

In Korea, various kinds of ultra-rapid-set cements have been developed and frequently used since 1970, but these cements are not stable for a long term since products after hydration reactions are isolated. In particular, since these cements are weak against calcium chloride, when these cements are exposed to a deicing agent used in winter, durability performance is deteriorated, for example due to severe surface separation.

In addition, in case of the high-early-strength concrete, an initial setting generally appears after 60 minutes, a concrete mixer truck may be carefully used if a transporting distance is not long. However, in case of an ultrahigh-early-strength concrete and a rapid-hardening concrete, an initial setting generally appears within 60 minutes, and thus it is substantially impossible to produce these concretes at a batcher plant and transport them using a concrete mixer truck. Therefore, in this case, a mobile mixer or a small mixer is used, which increases production costs.

Here, the initial setting means a state where a cement paste is still soft but has no fluidity, and the time at this is called an initial setting time. Also, the final setting means a state where the cement paste looks like being coagulated as time passes, and the time at this is called a final setting time.

RELATED PRIOR ART REFERENCES

Korean Patent Registration No. 10-0537953
Korean Patent Registration No. 10-0958535

DISCLOSURE OF THE INVENTION

Technical Problem

The present disclosure is designed to solve the above problems, and the present disclosure is directed to providing an apparatus for producing a rapid-hardening concrete by intermixing and dissipating air in a normal concrete and adding an early-strength admixture thereto, which intermixes air bubbles and an early-strength admixture to a normal concrete, which is prepared by mixing water, cement, aggregate and so on and transported to a construction site, to form a mixed concrete where the early-strength admixture is regularly dispersed in the normal concrete by means of an ball bearing effect of the air bubbles, and when the mixed concrete is discharged, blows a high-pressure air to dissipate excess air included in the mixed concrete and shoots a rapid-hardening concrete whose slump increased due to the large amount of air bubbles is reduced to a slump range of the normal concrete, and a method for producing the same.

The present disclosure is also directed to providing an apparatus for producing a rapid-hardening concrete by intermixing and dissipating air in a normal concrete and adding an early-strength admixture thereto, which may improve economic feasibility by reducing production and construction costs since a rapid-hardening concrete may be prepared at a construction site as much as required.

Technical Solution

In one general aspect, the present disclosure provides an apparatus for producing a rapid-hardening concrete by intermixing and dissipating air in a normal concrete and adding an early-strength admixture thereto, the apparatus comprising:

a normal concrete forming unit configured to mix water, cement and aggregate at a predetermined ratio to form a normal concrete;

an air bubble and early-strength admixture putting unit configured to put air bubbles and an early-strength admixture into the normal concrete to increase a slump of the normal concrete;

a mixed concrete forming unit configured to mix the normal concrete with the air bubbles and the early-strength admixture put into the normal concrete to form a mixed concrete by rotating a shaft formed in a concrete mixer truck and a mixing member protruding on the shaft by means of a power of a motor; and a rapid-hardening concrete shooting unit configured to shoot a rapid-hardening concrete whose slump increased due to the air bubbles is reduced to a slump range of the normal concrete, while dissipating air bubbles included in the mixed concrete by blowing a high-pressure air of 5 atmospheres or above, when the mixed concrete is discharged.

In another aspect, the present disclosure provides a method for producing a rapid-hardening concrete by intermixing and dissipating air in a normal concrete and adding an early-strength admixture thereto, the method comprising:

forming a normal concrete by mixing water, cement and aggregate at a predetermined ratio;

putting air bubbles and an early-strength admixture into the normal concrete to increase a slump of the normal concrete;

forming a mixed concrete by mixing the normal concrete with the air bubbles and the early-strength admixture put into the normal concrete by rotating a shaft formed in a concrete mixer truck and a mixing member protruding on the shaft by means of a power of a motor; and shooting a rapid-hardening concrete whose slump increased due to the air bubbles is reduced to a slump range of the normal concrete, while dissipating air bubbles included in the mixed concrete by blowing a high-pressure air of 5 atmospheres or above, when the mixed concrete is discharged.

Advantageous Effects

According to the present disclosure, when a rapid-hardening concrete is formed, air bubbles and an early-strength admixture are intermixed into a normal concrete to form a mixed concrete where the early-strength admixture is regularly dispersed in the normal concrete by means of an ball bearing effect of the air bubbles, and when the mixed concrete is discharged, a high-pressure air is blown to reduce excess air included in the mixed concrete and a rapid-hardening concrete whose slump greatly increased due to the large amount of air bubbles is reduced to a slump range of the normal concrete is shot to the mixed concrete, thereby ensuring a rapid-hardening property.

In addition, according to the present disclosure, since a rapid-hardening concrete may be prepared at a construction site as much as required, it is possible to improve economic feasibility by reducing production and construction costs.

DETAILED DESCRIPTION OF MAIN ELEMENTS

100: apparatus for producing a rapid-hardening concrete
110: normal concrete forming unit
120: air bubble and early-strength admixture putting unit
130: mixed concrete forming unit
140: rapid-hardening concrete shooting unit

MODE FOR CARRYING OUT THE INVENTION

Figure 1:
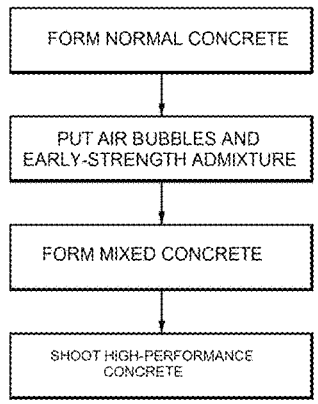
FIG. 1 is a flowchart of the present disclosure.
Figure 2:
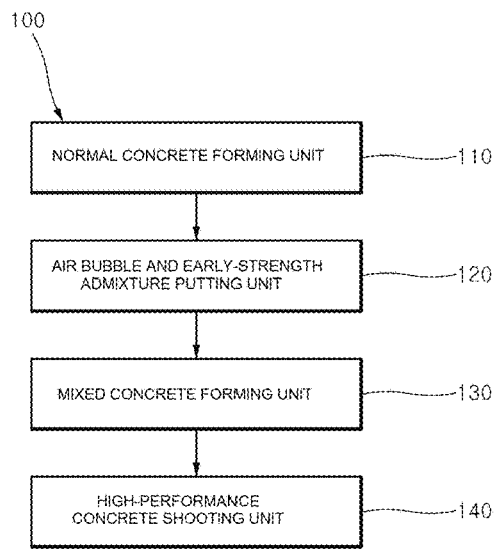
FIG. 2 is a schematic view of the present disclosure.

Hereinafter, the present disclosure will be described in detail with reference to accompanying drawings. FIG. 1 is a flowchart of the present disclosure, and FIG. 2 is a schematic view of the present disclosure.

An apparatus for producing a rapid-hardening concrete by intermixing and dissipating air in a normal concrete and adding an early-strength admixture thereto according to the present disclosure includes a normal concrete forming unit 110 configured to mix water, cement and aggregate at a predetermined ratio to form a normal concrete, an air bubble and early-strength admixture putting unit 120 configured to put air bubbles and an early-strength admixture into the normal concrete to increase a slump of the normal concrete, a mixed concrete forming unit 130 configured to mix the normal concrete with the air bubbles and the early-strength admixture put into the normal concrete to form a mixed concrete by rotating a shaft 131 formed in a concrete mixer truck 111 and a mixing member 132 protruding on the shaft 131 by means of a power of a motor, and a rapid-hardening concrete shooting unit 140 configured to shoot a rapid-hardening concrete whose slump increased due to the air bubbles is reduced to a slump range of the normal concrete, while dissipating air bubbles included in the mixed concrete by blowing a high-pressure air of 5 atmospheres or above, when the mixed concrete is discharged.

In addition, an apparatus for producing a rapid-hardening concrete by intermixing and dissipating air in a normal concrete and adding an early-strength admixture thereto includes a normal concrete forming unit 110 configured to mix water, cement and aggregate at a predetermined ratio to form a normal concrete, an air bubble and early-strength admixture putting unit 120 configured to put air bubbles and an early-strength admixture into the normal concrete to increase a slump of the normal concrete, a mixed concrete forming unit 130' configured to supply the normal concrete along with the air bubbles and the early-strength admixture put into the normal concrete to a movement guide member 134 through a hopper 133 and mix the normal concrete with the air bubbles and the early-strength admixture by means of a rotation of a screw 135 to form a mixed concrete, and rapid-hardening concrete shooting unit 140 configured to shoot a rapid-hardening concrete whose slump increased due to the air bubbles is reduced to a slump range of the normal concrete, while dissipating air bubbles included in the mixed concrete by blowing a high-pressure air of 5 atmospheres or above, when the mixed concrete is discharged.

The air bubble and early-strength admixture putting unit 120 may put the air bubbles and slurry in order, or put air bubble slurry in which the air bubbles is mixed with the slurry.

The slurry may be produced by mixing the early-strength admixture with water.

The early-strength admixture is formed by mixing at least one selected from the group consisting of alumina-based ultra-rapid-set clinker powder, amorphous alumina-based ultra-rapid-set clinker powder, Hauyne ultra-rapid-set clinker powder, and mixtures thereof.

The high-early-strength concrete manifests a compressive strength of 21 MPa, which is a usable strength, within 3 days after being mixed with water, and the early-strength admixture is mixed by the content of 5 to 20 parts by weight, based on 100 parts by weight of cement of the normal concrete.

The ultrahigh-early-strength concrete manifests a compressive strength of 21 MPa, which is a usable strength, within one day after being mixed with water, and the early-strength admixture is mixed by the content of 15 to 25 parts by weight, based on 100 parts by weight of cement of the normal concrete.

The ultra-rapid-set concrete manifests a compressive strength of 21 MPa, which is a usable strength, within 3 hours after being mixed with water, and the early-strength admixture is mixed by the content of 25 to 40 parts by weight, based on 100 parts by weight of cement of the normal concrete.

The air bubbles are generated by any one of an air bubble agent, an air bubble generator and a foaming agent, and the air bubbles are mixed to occupy 20 to 40%, based on 100% of the normal concrete.

After a large amount of mixed air bubbles plays its role of regularly dispersing the early-strength admixture into the normal concrete, an antifoaming agent is added to reduce excessive air bubbles in aspect of strength and slump of the rapid-hardening concrete.

The rapid-hardening concrete shooting unit 140 includes a shooting guide member 141 detachably mounted to the mixed concrete forming unit and configured to have a central portion with a smaller diameter than both ends thereof which are perforated so that the mixed concrete is compressed and discharged, and an air supply hole 142 formed through the shooting guide member 141 to supply a high-pressure air of 5 atmospheres or above so as to reduce an air volume while dissipating air bubbles included in the mixed concrete which is moved to the shooting guide member 141.

The air supply hole 142 is formed with a slope in a radial direction through an outer circumference of the shooting guide member 141.

Next, a producing method of the present disclosure configured as above will be described.

Figure 3:
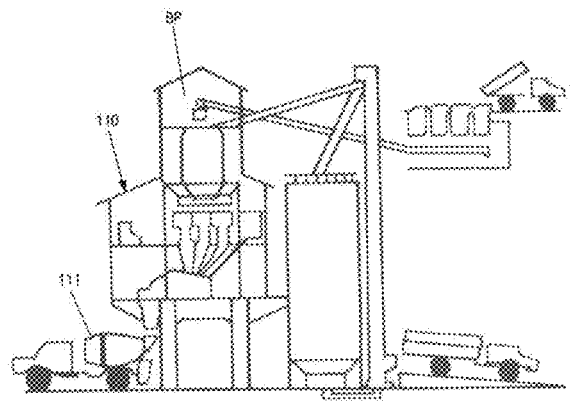
FIG. 3 is a diagram showing a normal concrete forming unit according to the present disclosure.

First, as shown in FIG. 3, a normal concrete formed by mixing and blending water, cement, aggregate or the like respectively supplied from a batcher plant (BP) at a predetermined ratio and having a slump of 60 mm or above is transported to a construction site by means of a concrete mixer truck 111, and a normal concrete having a slump of 40 mm or below is transported to a construction site by means of a dump truck.

Figure 4:
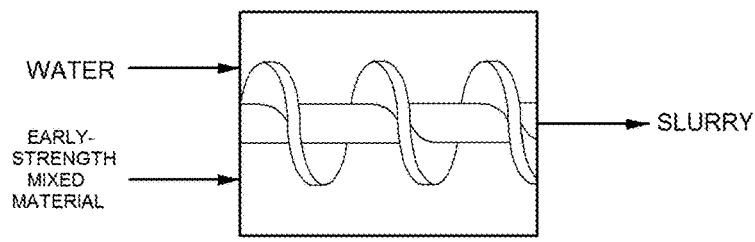
FIG. 4 is a diagram showing a process of generating slurry according to the present disclosure.
Figure 5:
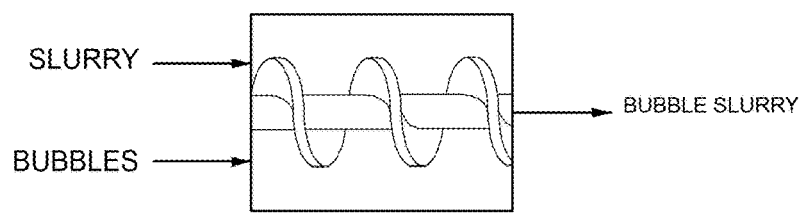
FIG. 5 is a diagram showing a process of generating air bubble slurry according to the present disclosure.

In addition, as shown in FIGS. 4 and 5, an early-strength admixture formed by mixing at least one selected from the group consisting of alumina-based ultra-rapid-set clinker powder, amorphous alumina-based ultra-rapid-set clinker powder, Hauyne ultra-rapid-set clinker powder, and mixtures thereof from the air bubble and early-strength admixture putting unit 120 is mixed with water at a ratio of 1:1 to produce slurry, and the produced slurry is mixed with air bubbles produced by an air bubble agent or an air bubble generator to form air bubble slurry. After that, the air bubble slurry put into the normal concrete. Here, the air bubble slurry may be prepared by mixing 1 kg of early-strength admixture to 8 to 10 L of air bubbles, but in consideration of strength and slump of a final rapid-hardening concrete.

At this time, the air bubble agent is an admixture which is generally diluted with 30 to 50 times of water and physically introduces air bubbles by means of a detergent action, so that air bubbles produced at the outside is put into a prepared normal concrete. Here, an air volume may be obtained up to about 80, but in the present disclosure, an effect amount of air bubbles may be 20 to 40% in comparison to the entire rapid-hardening concrete. Also, the air bubbles may be minute air bubbles having a substantially spherical shape and a size in the range of 0.01 to 0.3 mm.

The air bubbles may be generated using a foaming agent. The foaming agent generates air bubbles while being added to the normal concrete, stirred and mixed again, by means of rapid rotation of a mixer. Here, even though large air bubbles are generated at an initial stage, the large air bubbles are broken down during a stirring process to have relatively uniform distribution. However, the amount of generated air bubbles greatly varies depending on a mixing period. The foaming agent may employ aluminum powder and be included by the content of 0.1 to 0.5% in comparison to the entire rapid-hardening concrete.

Figure 6:
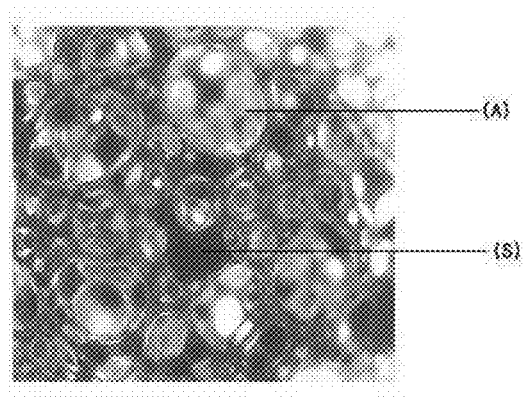
FIG. 6 is an enlarged photograph showing the air bubble slurry produced in FIG. 5.

An enlarged photograph of the air bubble slurry including air bubbles and an early-strength admixture is depicted in FIG. 6, and it may be found that air bubbles (A) included in the air bubble slurry have a size of about 0.1 to 1 mm, and the early-strength admixture (S) is regularly scattered and distributed among the air bubbles.

Even though it has been described that the air bubble slurry in which air bubbles and slurry are mixed is put into the normal concrete, it is also possible that air bubbles and slurry are put into the normal concrete in order.

In addition, without making the slurry, air bubbles and an early-strength admixture formed by mixing at least one of alumina-based ultra-rapid-set clinker powder, amorphous alumina-based ultra-rapid-set clinker powder, Hauyne ultra-rapid-set clinker powder, and mixtures thereof may be put into the normal concrete.

Here, the high-early-strength concrete manifesting a compressive strength of 21 MPa within 3 days is formed by mixing 5 to 20 parts by weight of early-strength admixture, based on 100 parts by weight of cement of the normal concrete. Also, the ultrahigh-early-strength concrete manifesting a compressive strength of 21 MPa within one day is formed by mixing 15 to 25 parts by weight of early-strength admixture, based on 100 parts by weight of cement of the normal concrete. In addition, the ultra-rapid-set concrete manifesting a compressive strength of 21 MPa within 3 hours is formed by mixing 25 to 40 parts by weight of early-strength admixture, based on 100 parts by weight of cement of the normal concrete. Here, if the content of the early-strength admixture is smaller than the above ranges, high strength and high durability may be deteriorated. Also, if the content of the early-strength admixture is greater than the above ranges, construction costs increase without enhancing high strength and high durability further.

The mixed concrete forming unit 130 mixes the normal concrete with the air bubbles and the early-strength admixture put by the air bubble and early-strength admixture putting unit 120 as described above or mixes the normal concrete with the air bubble slurry. Here, regarding a mixing ratio of the normal concrete and the air bubble slurry, 300 to 400 L of air bubble slurry is mixed per 1 m3 of the normal concrete so that air bubbles are included in the mixed concrete by the content of 30 to 35%.

Figure 7:
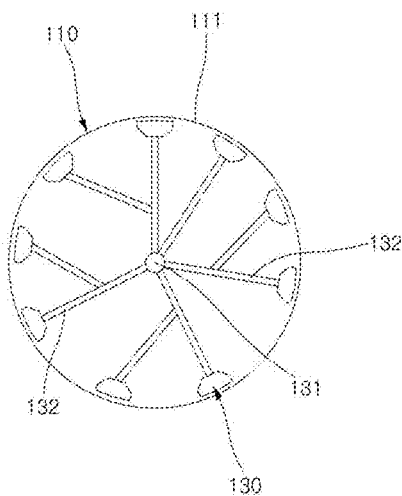
FIGS. 7 and 8 are diagrams showing a mixed concrete forming unit according to the present disclosure.
Figure 8:
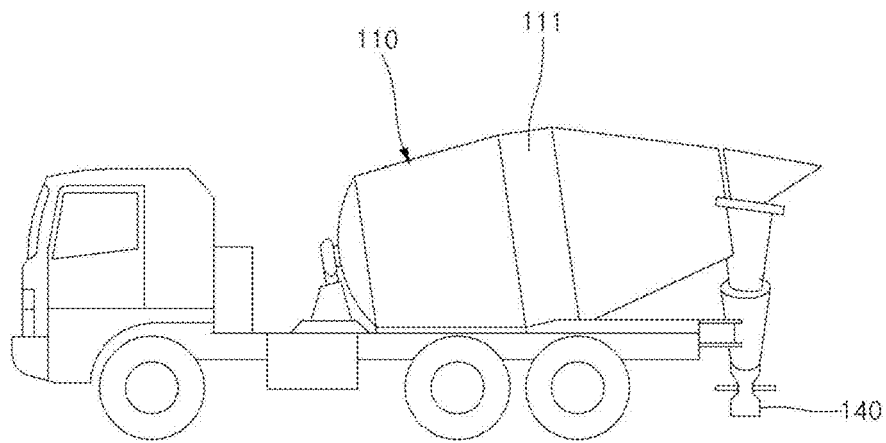

As shown in FIGS. 7 and 8, the mixed concrete forming unit 130 forms a mixed concrete where the early-strength admixture is well dispersed in the normal concrete, by means of a ball bearing effect of the air bubbles, by rotating the shaft 131 formed in the concrete mixer truck 111 by means of a power of a motor and simultaneously rotating the mixing member 132 formed at the shaft 131 to have at least one stage in a radial direction so that the normal concrete is mixed with the air bubble slurry, or mixed with the air bubbles and the early-strength admixture, or mixed with the foaming agent and the early-strength admixture.

Figure 9:
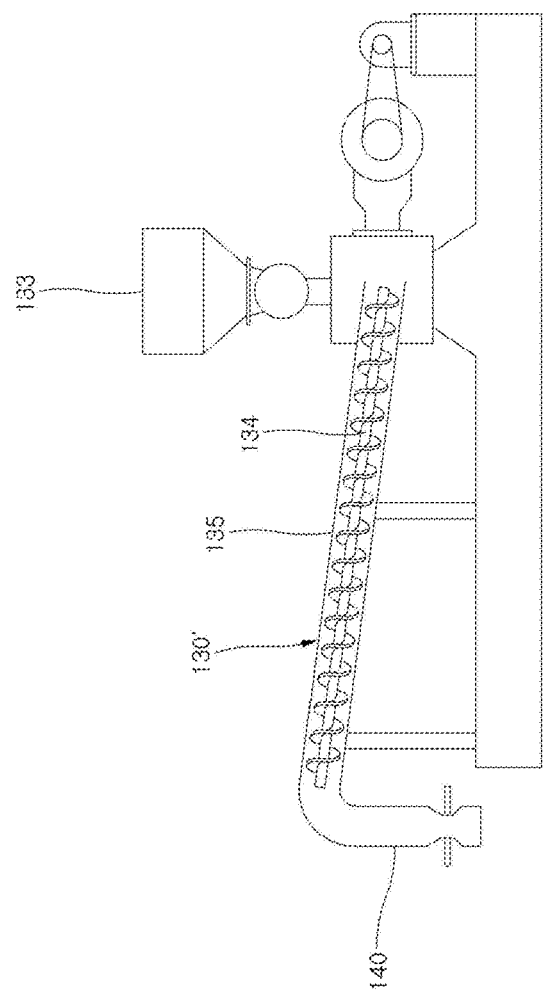
FIG. 9 is a diagram showing a mixed concrete according to another embodiment of the present disclosure.

In addition, as shown in FIG. 9, a normal concrete having a slump of 40 mm or below is transported using a dump truck and supplied to the movement guide member 134 through the hopper 133 of the mixed concrete forming unit 130', and simultaneously the normal concrete supplied to the movement guide member 134 is moved along the movement guide member 134 by means of a rotation of the screw 135. Also, the air bubble and early-strength admixture putting unit 120 puts air bubbles and an early-strength admixture to the normal concrete moving along the movement guide member 134, and the normal concrete is mixed with the early-strength admixture by means of a rotation of the screw 135.

At this time, the air bubbles and the early-strength admixture may be put separately, but the air bubble slurry may be put into the normal concrete since the air bubbles and the early-strength admixture may be mixed with the normal concrete within a short time by means of a rotation of the screw 135.

Here, the mixed concrete forming unit 130' is a vertical stirring mixer, which is formed with a slope so that an outlet is higher than an inlet, and thus the bubble slurry and the normal concrete may be easily mixed due to a height difference of the mixing member 135.

Figure 10:
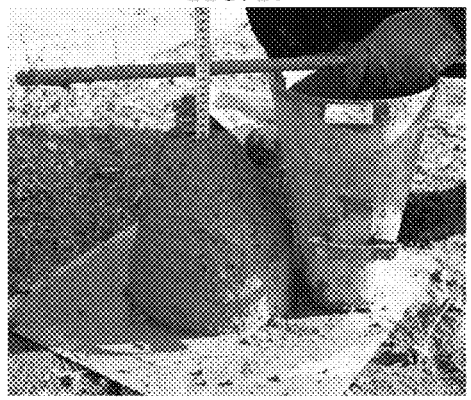
FIGS. 10 and 11 are photographs showing slumps of a normal concrete and a mixed concrete applied to the present disclosure.
Figure 11:

In addition, FIG. 10 shows a slump of the normal concrete. Here, a mixing ratio of water, cement, aggregate and so on used for the normal concrete conforms to a standard mixing ratio widely used in the art, and the slump is 0 mm. However, FIG. 11 shows that the normal concrete has a greatly increased slump of 230 mm after air bubble slurry is mixed thereto. In other words, even though FIG. 10 shows that an air volume in the normal concrete is 3% before air bubble slurry is mixed thereto, FIG. 11 shows that an air volume in the normal concrete greatly increases to 26% after air bubble slurry is mixed thereto.

The greatly increased amount of air may allow the early-strength admixture to be regularly dispersed in the normal concrete due to a ball bearing effect. However, if the mixed concrete includes a large amount of air, the strength and durability of the mixed concrete are greatly deteriorated. Regarding a relation of the air volume and the compressive strength of a general normal concrete, if the air volume in the normal concrete increases as much as 1%, the compressive strength decrease as much as about 4%. In other words, the mixed concrete mixed with a large amount of air bubbles as described above has so seriously deteriorated strength not to be used as a structural material, and also the mixed concrete has a greatly increased slump, beyond the workable range for depositing the mixed concrete.

Figure 12:
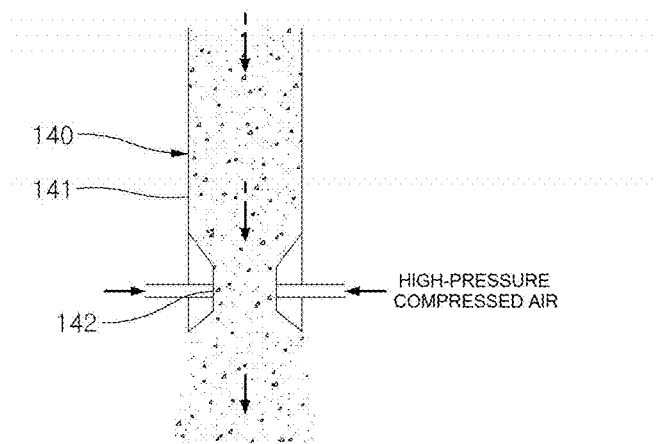
FIGS. 12 and 13 are diagrams for illustrating a process of shooting a rapid-hardening concrete by using a rapid-hardening concrete shooting unit according to the present disclosure.
Figure 13:
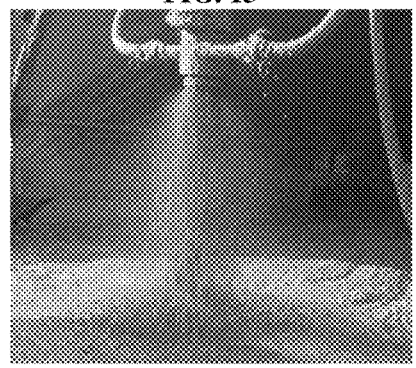

Therefore, in the present disclosure, as shown in FIGS. 12 and 13, in order to reduce the large amount of air included in the mixed concrete mixed at the mixed concrete forming unit 130, 130', an antifoaming agent is added to the mixed concrete or shorted by means of the rapid-hardening concrete shooting unit 140.

The antifoaming agent is a material for suppressing generation of air bubbles used for removing and controlling air bubbles mixed for regularly dispersing the early-strength admixture into the normal concrete. Here, breaking the generated air bubbles is called bubble breaking, and suppressing the generation of air bubbles from the first is called bubble control. In the present disclosure, since the antifoaming agent is used for removing excessive air bubbles, the antifoaming agent may be called a bubble breaker. Various kinds of antifoaming agents may be used for the mixed concrete, and 0.1 to 2.0 parts by weight of antifoaming agent may be included, based on 100 parts by weight of rapid-hardening concrete.

When the mixed concrete is shot by means of the rapid-hardening concrete shooting unit 140, the mixed concrete is supplied to an inlet of the shooting guide member 141 which is detachably mounted to the concrete mixer truck 111 of the mixed concrete forming unit 130 or the movement guide member 134 of the mixed concrete forming unit 130'.

Here, since the shooting guide member 141 is formed so that both ends at its inlet and outlet have a smaller diameter than its central portion, the mixed concrete supplied to the shooting guide member 141 is compressed to generate a pressure.

Figure 14:
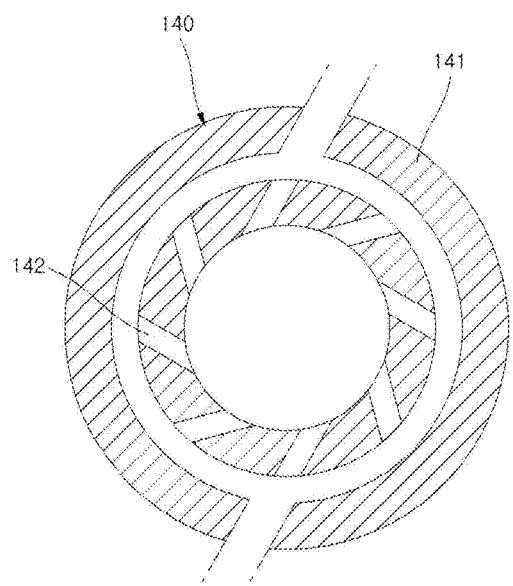
FIG. 14 is a diagram showing a planar sectional view showing a rapid-hardening concrete shooting unit according to the present disclosure.
Figure 15:
FIG. 15 is a photograph showing a slump of a rapid-hardening concrete according to the present disclosure.

In addition, as shown in FIG. 14, when the mixed concrete passes through the outlet of the shooting guide member 141 having a larger diameter than its central portion via the central portion, a compressed air having a high pressure of 5 atmospheres or above is supplied to the air supply hole 142 formed with a slope with a slope in a radial direction at the outer circumference of the shooting guide member 141 to be swirled and shot to the outlet of the shooting guide member 141. At this time, the compressed air and the mixed concrete are spread in a spraying manner, and the compressed air collides with the mixed concrete to dissipate the large amount of bubbles included in the mixed concrete.

The amount of air bubbles included in the mixed concrete from which the air bubbles are dissipated is close to the range of air volume included in the normal concrete before being mixed with the air bubble slurry. In addition, as the air volume included in the mixed concrete is reduced to the range of 3 to 7%, the slump is also reduced to an original level, which makes it possible to shoot the rapid-hardening concrete ensuring good workability, high strength and high durability.

Figure 16:
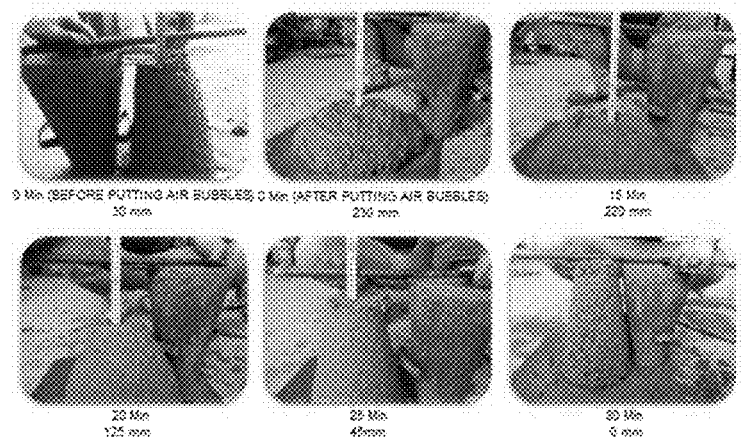
FIG. 16 is a photograph showing a slump loss of the mixed concrete along with time according to the present disclosure.
Figure 17:
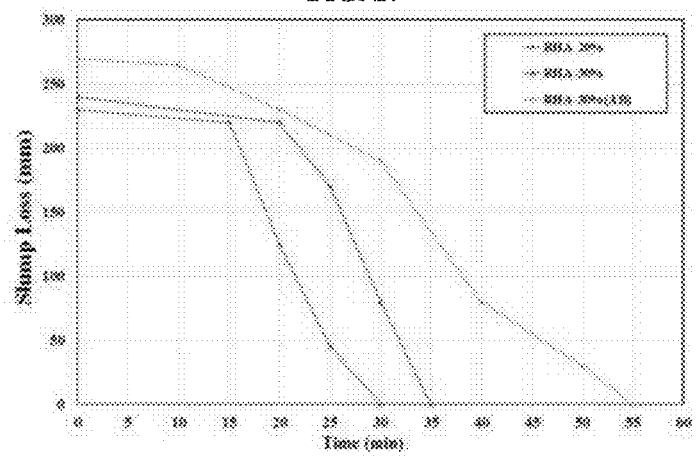
FIG. 17 is a graph of each slump loss variable of the mixed concrete along with time according to the present disclosure.

Basic properties and durability of the rapid-hardening concrete were measured according to KS standards and ASTM, as shown in Table 1 in detail. As shown in FIGS. 16 and 17, a slump loss test was performed at 5 minute intervals, and the mixed concrete was continuously stirred while the test was not performed. As a result of the slump loss test for the mixed concrete mixed with an early-strength admixture and air bubbles, it may be found that after about 15 to 20 minutes, a slump was lowered to 200 mm or below, and after about 30 to 35 minutes, the mixed concrete mostly loses fluidity.

TABLE 1

Details of the basic properties and durability test

| Test items | | Test schedule and mold sample size | Measuring method | Amount |
|---|---|---|---|---|
| Characteristics before hardening | Slump loss | Before depositing shotcrete | — | KS F 2402 | 5 minute intervals |
| | Air volume | Before and after depositing shotcrete | — | KS F 2421KS F 2449 | One time |
| | Setting test | Before depositing shotcrete | | KS F 2436 | One time |
| Strength characteristics | Compressive strength | After depositing shotcrete | Ø100*200 (12 hr, 1 D, 3 D 7 D, 28 D) | KS F 2405 | 15 ea |
| | Bending strength | After depositing shotcrete | 100*100*460 (12 hr, 1 D, 28 D) | KS F 2566 | 9 ea |

In addition, in the setting test for the mixed concrete, as shown in FIG. 17 and Table 2, as a result of the setting test for the mixed concrete, it may be found that in case of RHA-20% variable, an initial setting appears at 68 minutes, and a final setting appears at 98 minutes. Also, in RHA-30% variable, an initial setting appears at 59 minutes, and a final setting appears at 76 minutes. In addition, in RHA-30% (AB) variable, it may be found that a setting delay is increased great in comparison to an existing mixing.

TABLE 2

Setting time of each variable

| Type | Setting | Time (minutes) |
|---|---|---|
| RHA-20% | Initial setting | 68 |
| | Final setting | 98 |
| RHA-30% | Initial setting | 59 |
| | Final setting | 76 |
| RHA-30% (AB) | Initial setting | 129 |
| | Final setting | 158 |
| normal concrete (OPC) | Initial setting | 282 |
| | Final setting | 404 |

Figure 18:
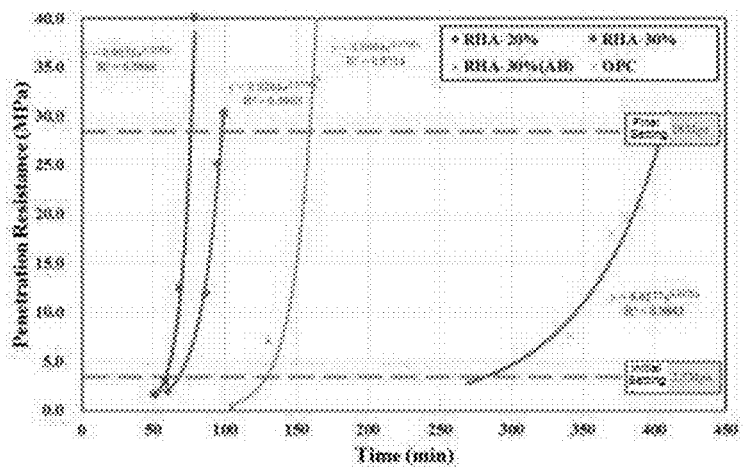
FIG. 18 is a graph showing a result of a setting test for the mixed concrete according to the present disclosure.
Figure 19:
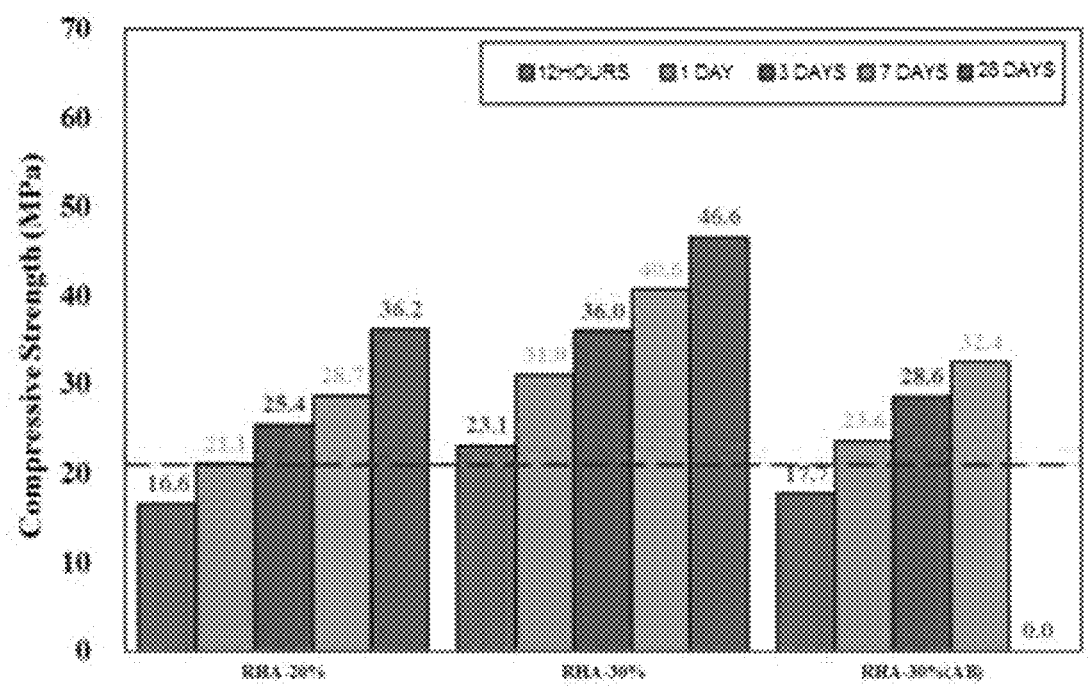
FIG. 19 is a graph showing a result of a compressive strength test for the mixed concrete according to the present disclosure.

In addition, as shown in FIG. 18, it may be found that the compressive strength of the mixed concrete satisfies 21 MPa or above for 12 hours or more only in the RHA-30% variable, and after 1 day, the compressive strength of the mixed concrete satisfies 21 MPa or above in all variables. Also, it may be found that the RHA-30% (AB) variable having a great setting delay exhibits a similar strength characteristic to the RHA-20% variable.

In the present disclosure, the embodiment is just an example, and the present disclosure is not limited thereto. Any feature whose construction and effect are identical to those defined in the claims of the present disclosure should be regarded as falling within the scope of the present disclosure.

In particular, even though the early-strength admixture employs alumina-based ultra-rapid-set clinker powder, amorphous alumina-based ultra-rapid-set clinker powder, Hauyne ultra-rapid-set clinker powder or the like in the embodiment of the present disclosure, early-strength admixtures other than the above early-strength admixture may also be applied to the producing apparatus and method of the present disclosure as long as they exhibit a rapid-hardening property and has economic feasibility.

The invention claimed is:

1. An apparatus for producing a rapid-hardening concrete by intermixing and dissipating air in a normal concrete and adding an early-strength admixture thereto, the apparatus comprising:

a normal concrete forming unit configured to mix water, cement and aggregate at a predetermined ratio to form a normal concrete;

an air bubble and early-strength admixture putting unit configured to put air bubbles and an early-strength admixture into the normal concrete to increase a slump of the normal concrete;

a mixed concrete forming unit configured to mix the normal concrete with the air bubbles and the early-strength admixture put into the normal concrete to form a mixed concrete by rotating a shaft formed in a concrete mixer truck and a mixing member protruding on the shaft by means of a power of a motor; and a rapid-hardening concrete shooting unit configured to shoot a rapid-hardening concrete whose slump increased due to the air bubbles is reduced to a slump range of the normal concrete, while dissipating air bubbles included in the mixed concrete by blowing a high-pressure air of 5 atmospheres or above, when the mixed concrete is discharged.

2. An apparatus for producing a rapid-hardening concrete by intermixing and dissipating air in a normal concrete and adding an early-strength admixture thereto, the apparatus comprising:
  a normal concrete forming unit configured to mix water, cement and aggregate at a predetermined ratio to form a normal concrete;
  an air bubble and early-strength admixture putting unit configured to put air bubbles and an early-strength admixture into the normal concrete to increase a slump of the normal concrete;
  a mixed concrete forming unit configured to supply the normal concrete along with the air bubbles and the early-strength admixture put into the normal concrete to a movement guide member through a hopper and mix the normal concrete with the air bubbles and the early-strength admixture by means of a rotation of a screw to form a mixed concrete; and
  a rapid-hardening concrete shooting unit configured to shoot a rapid-hardening concrete whose slump increased due to the air bubbles is reduced to a slump range of the normal concrete, while dissipating air bubbles included in the mixed concrete by blowing a high-pressure air of 5 atmospheres or above, when the mixed concrete is discharged.

3. The apparatus for producing a rapid-hardening concrete by intermixing and dissipating air in a normal concrete and adding an early-strength admixture thereto of claim 1, wherein the air bubble and early-strength admixture putting unit puts the air bubbles and slurry in order, or puts air bubble slurry in which the air bubbles is mixed with the slurry.

4. The apparatus for producing a rapid-hardening concrete by intermixing and dissipating air in a normal concrete and adding an early-strength admixture thereto of claim 3, wherein the slurry is produced by mixing the early-strength admixture with water.

5. The apparatus for producing a rapid-hardening concrete by intermixing and dissipating air in a normal concrete and adding an early-strength admixture thereto of claim 4, wherein the early-strength admixture is formed by mixing at least one selected from the group consisting of alumina-based ultra-rapid-set clinker powder, amorphous alumina-based ultra-rapid-set clinker powder, Hauyne ultra-rapid-set clinker powder, and mixtures thereof.

6. The apparatus for producing a rapid-hardening concrete by intermixing and dissipating air in a normal concrete and adding an early-strength admixture thereto of claim 5, wherein in order to prepare the high-early-strength concrete, the early-strength admixture is mixed by the content of 5 to 20 parts by weight, based on 100 parts by weight of cement of the normal concrete.

7. The apparatus for producing a rapid-hardening concrete by intermixing and dissipating air in a normal concrete and adding an early-strength admixture thereto of claim 5, wherein in order to prepare an ultrahigh-early-strength concrete, the early-strength admixture is mixed by the content of 15 to 25 parts by weight, based on 100 parts by weight of cement of the normal concrete.

8. The apparatus for producing a rapid-hardening concrete by intermixing and dissipating air in a normal concrete and adding an early-strength admixture thereto of claim 5, wherein in order to prepare an ultra-rapid-set concrete, the early-strength admixture is mixed by the content of 25 to 40 parts by weight, based on 100 parts by weight of cement of the normal concrete.

9. The apparatus for producing a rapid-hardening concrete by intermixing and dissipating air in a normal concrete and adding an early-strength admixture thereto of claim 3, wherein the air bubbles are generated by any one of an air bubble agent, an air bubble generator and a foaming agent.

10. The apparatus for producing a rapid-hardening concrete by intermixing and dissipating air in a normal concrete and adding an early-strength admixture thereto of claim 9, wherein an antifoaming agent is added to reduce air excessively put by the air bubble agent and the foaming agent.

11. The apparatus for producing a rapid-hardening concrete by intermixing and dissipating air in a normal concrete and adding an early-strength admixture thereto of claim 1, wherein the rapid-hardening concrete shooting unit includes:
  a shooting guide member detachably mounted to the mixed concrete forming unit and configured to have a central portion with a smaller diameter than both ends thereof which are perforated so that the mixed concrete is compressed and discharged; and
  an air supply hole formed through the shooting guide member to supply a high-pressure air of 5 atmospheres or above so as to reduce an air volume while dissipating air bubbles included in the mixed concrete which is moved to the shooting guide member.

12. The apparatus for producing a rapid-hardening concrete by intermixing and dissipating air in a normal concrete and adding an early-strength admixture thereto of claim 11, wherein the air supply hole is formed with a slope in a radial direction through an outer circumference of the shooting guide member.

13. The apparatus for producing a rapid-hardening concrete by intermixing and dissipating air in a normal concrete and adding an early-strength admixture thereto of claim 2, wherein the air bubble and early-strength admixture putting unit puts the air bubbles and slurry in order, or puts air bubble slurry in which the air bubbles is mixed with the slurry.

14. The apparatus for producing a rapid-hardening concrete by intermixing and dissipating air in a normal concrete and adding an early-strength admixture thereto of claim 13, wherein the slurry is produced by mixing the early-strength admixture with water.

15. The apparatus for producing a rapid-hardening concrete by intermixing and dissipating air in a normal concrete and adding an early-strength admixture thereto of claim 14, wherein the early-strength admixture is formed by mixing at least one selected from the group consisting of alumina-based ultra-rapid-set clinker powder, amorphous alumina-based ultra-rapid-set clinker powder, Hauyne ultra-rapid-set clinker powder, and mixtures thereof.

16. The apparatus for producing a rapid-hardening concrete by intermixing and dissipating air in a normal concrete and adding an early-strength admixture thereto of claim 15, wherein in order to prepare the high-early-strength concrete, the early-strength admixture is mixed by the content of 5 to 20 parts by weight, based on 100 parts by weight of cement of the normal concrete.

17. The apparatus for producing a rapid-hardening concrete by intermixing and dissipating air in a normal concrete and adding an early-strength admixture thereto of claim 15, wherein in order to prepare an ultrahigh-early-strength concrete, the early-strength admixture is mixed by the content of 15 to 25 parts by weight, based on 100 parts by weight of cement of the normal concrete.

18. The apparatus for producing a rapid-hardening concrete by intermixing and dissipating air in a normal concrete and adding an early-strength admixture thereto of claim 15, wherein in order to prepare an ultra-rapid-set concrete, the early-strength admixture is mixed by the content of 25 to 40 parts by weight, based on 100 parts by weight of cement of the normal concrete.

19. The apparatus for producing a rapid-hardening concrete by intermixing and dissipating air in a normal concrete and adding an early-strength admixture thereto of claim 13, wherein the air bubbles are generated by any one of an air bubble agent, an air bubble generator and a foaming agent.

20. The apparatus for producing a rapid-hardening concrete by intermixing and dissipating air in a normal concrete and adding an early-strength admixture thereto of claim 19, wherein an antifoaming agent is added to reduce air excessively put by the air bubble agent and the foaming agent.

21. The apparatus for producing a rapid-hardening concrete by intermixing and dissipating air in a normal concrete and adding an early-strength admixture thereto of claim 2, wherein the rapid-hardening concrete shooting unit includes:
- a shooting guide member detachably mounted to the mixed concrete forming unit and configured to have a central portion with a smaller diameter than both ends thereof which are perforated so that the mixed concrete is compressed and discharged; and
- an air supply hole formed through the shooting guide member to supply a high-pressure air of 5 atmospheres or above so as to reduce an air volume while dissipating air bubbles included in the mixed concrete which is moved to the shooting guide member.

22. The apparatus for producing a rapid-hardening concrete by intermixing and dissipating air in a normal concrete and adding an early-strength admixture thereto of claim 21, wherein the air supply hole is formed with a slope in a radial direction through an outer circumference of the shooting guide member.

* * * * *